April 1, 1969  F. O. LUENBERGER  3,436,106
KEY DRIVE FOR SLIDING HUBS
Original Filed Jan. 24, 1964   Sheet 1 of 2
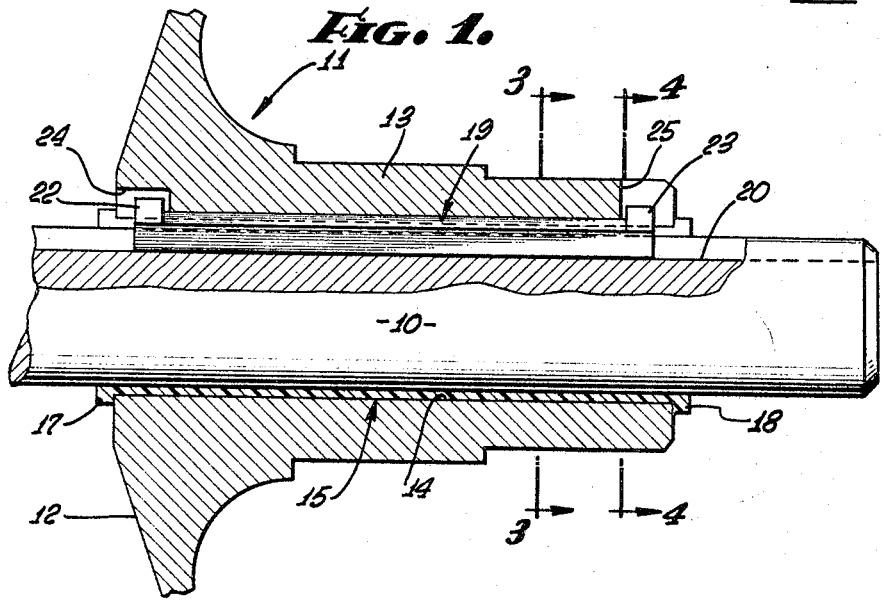
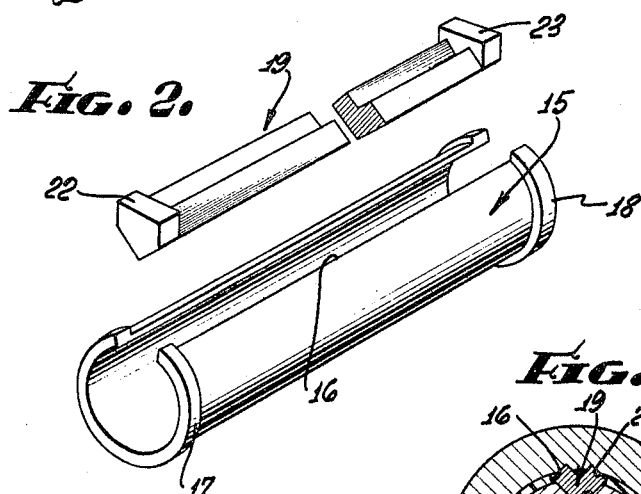
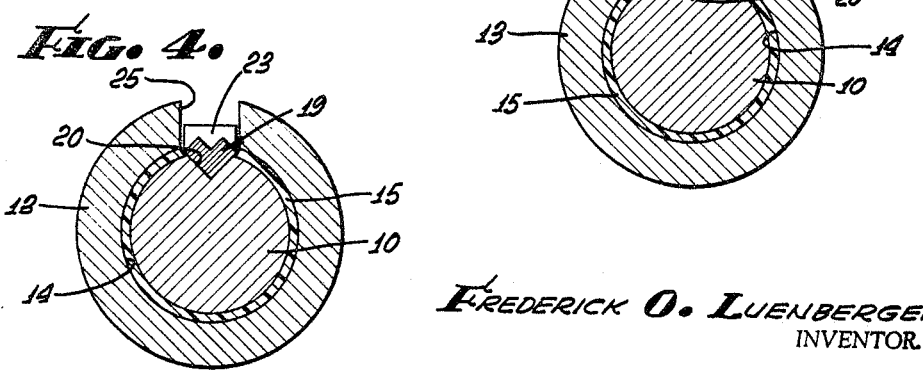
FREDERICK O. LUENBERGER
INVENTOR.
BY Flam and Flam
ATTORNEYS.

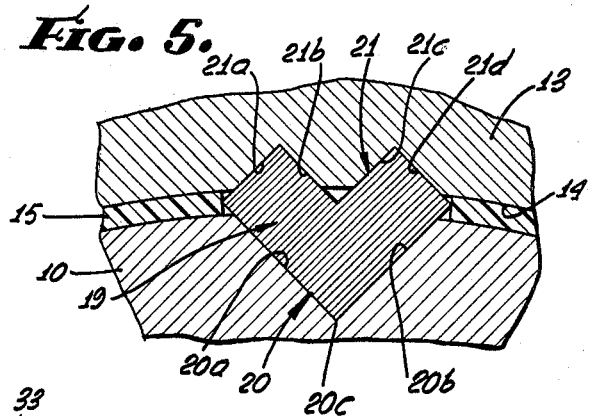
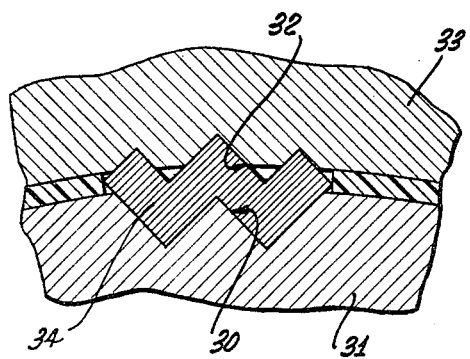
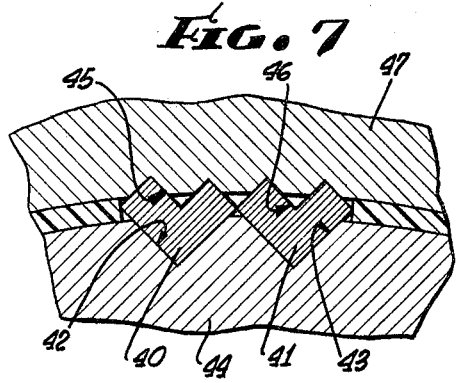
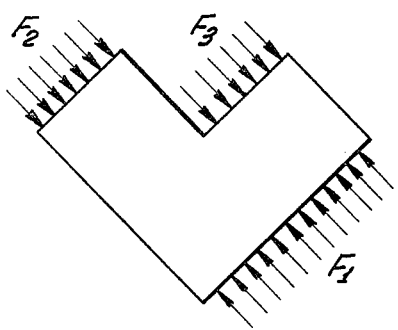

United States Patent Office 3,436,106
Patented Apr. 1, 1969

1

3,436,106
KEY DRIVE FOR SLIDING HUBS
Frederick O. Luenberger, Los Angeles, Calif., assignor to Emerson Electric Co., a corporation of Missouri
Continuation of application Ser. No. 340,052, Jan. 24, 1964. This application Dec. 17, 1965, Ser. No. 527,628
Int. Cl. F16d 1/06; B60b 27/06
U.S. Cl. 287—52.05          9 Claims This is a continuation of application Ser No. 340,052, filed Jan. 24, 1964, and now abandoned.

This invention relates to variable ratio transmission mechanisms utilizing variable diameter pulley structures, such as of the general type shown and described in my prior patent, No. 2,398,235, issued Apr. 9, 1946, and entitled, "Variable Ratio Transmission." More particularly this invention relates to the keying means between the axially slidable pulley element and its shaft.

It has been proposed to utilize a key carried by the hub of the axially slidable pulley section, and made of molded plastic or other material having a low coefficient of friction, with the metal material forming the keyway. Apparatus incorporating a key of this character is shown and described in the application of Vito Raso et al., Ser. No. 140,520, filed Sept. 25, 1961, and entitled, "Axially Adjustable Drive Mechanism." Known materials exhibiting low frictional properties, such as Teflon and Nylatron, have limited shear strength, and in order to transmit high torques, it is thus necessary to increase the physical size of the key. This is disadvantageous because keys of large section are difficult to mold, and large keys necessitate large structures in which they are to be mounted.

The primary object of this invention is to provide a modalble key structure that transmits torque through compressive loading of the key rather than by shear. In order to accomplish this result, the side wall of the recess in the driving member is so inclined that the normal projection thereof toward the driven member clears the remaining side walls of the recess and is directly opposed by recess walls in the driven member.

Another object of this invention is to provide a moldable key structure of this character that occupies limited radial space whereby the key can be housed by compact structures, and whereby a thin-walled key structure results that can readily be molded.

Another object of this invention is to provide a multiple key structure for transmitting large torques in which the keyways and recesses for the multiple key structure may be accurately located so that the load is equally distributed among the elements of the key structure. For this purpose, the multiple keyways and the multiple recesses are located so that they may respectively be formed by a single cutting tool, thus ensuring accuracy of fit.

This invention possesses many other advantages, and has other objects which may be made more clearly apparent from a consideration of several embodiments of the invention. For this purpose, there are shown a few forms in the drawings accompanying and forming part of the present specification, and which drawings, unless described as diagrammatic, or unless as otherwise indicated, are true scale. These forms will now be described in detail, illustrating the general principles of the invention; but it is to be understood that this detailed description is not to be taken in a limiting sense.

Referring to the drawings:

FIGURE 1 is a fragmentary axial sectional view of a portion of a variable diameter pulley structure mounted upon a shaft and incorporating the present invention;

FIG. 2 is an exploded pictorial view of two of the parts incorporated in the pulley structure;

2

FIGS. 3 and 4 are sectional views taken along planes indicated by lines 3—3 and 4—4 of FIG. 1;

FIG. 5 is an enlarged fragmentary transverse sectional view of the key structure;

FIGS. 6 and 7 are enlarged fragmentary transverse sectional views, similar to FIG. 5, and each showing modified key structures; and FIG. 8 is a diagrammatic view indicating the application of driving force to the key structure of FIGS. 1–5.

In FIG. 1 there is illustrated a portion of a variable ratio transmission mechanism generally of the type shown and described in my prior patent, above identified. A variable diameter pulley structure includes a pulley section 11 slidable along the shaft. The pulley section 11 has a conical surface 12 that is opposed to a corresponding conical surface formed on a companion pulley section (not shown). The peripheral part of the pulley element 11 is broken away. An edge active belt (not shown) cooperates with the conical surfaces of the pulley sections in a well-understood manner. As the pulley sections are moved closer together or farther apart, the effective diameter of the pulley structure is increased or decreased.

To achieve a variation in the effective pulley diameter, the pulley section 11 is moved along the shaft 10 while the companion pulley section is relatively fixed. The pulley section 11 has an extended hub part 13 provided with a through bore 14 in which the shaft 10 is accommodated. The bore and the shaft respectively provide substantially cylindrical internal and external surfaces defining between them a substantially cylindrical boundary region. Lining the bore is a bushing 15 that has an axial extending through slot 16. The bushing 15 may be made of suitable molded plastic material having a low coefficient of friction with metal, and such as Nylatron or Teflon. The bushing 15 has end collars 17 and 18 that interlock the edges at the ends of the bore 14 whereby the bushing 15 is mounted by the pulley section 11 for axial movement therewith. To install the bushing 15, it is constructed so as to allow passage of one of the collars 17 or 18 from one end of the hub bore to the other. When this is accomplished, the bushing snaps in place.

In order rotatably to couple the pulley section 11 and the shaft 10, a molded key structure 19 is provided. The cross-sectional configuration of the key, as shown in FIG. 5, is substantially of a block V. The key structure 19 fits a recess structure 21 in the hub bore 14 and, in a manner hereinafter to be described, is coupled to the hub part 13 for axial sliding movement therewith. The key structure 19 has a part projecting radially inwardly beyond the boundary region to fit a keyway 20 in the shaft 10. The axial slot 16 in the anti-friction bushing 15 provides clearance space for the key 19.

The keyway 20, as shown in FIG. 5, has a V-shaped configuration with the side walls 20a and 20b thereof inclined equally and oppositely to a radial plane passing through the apex 20c of the keyway. The side walls 20a and 20b extend in mutually perpendicular planes.

The recess 21 in the hub 13 has a double V-shaped configuration defined by four substantially contiguous side walls 21a, 21b, 21c and 21d. The combined angular span of the hub recess 21 equals the angular span of the keyway 20. The configuration of the key 19 on opposite sides accurately corresponds to that of the keyway 20 and the recess 21 respectively. End lugs 22 and 23 (FIGS. 1 and 2) formed integrally with the key 19 project into slots 24 and 25 (FIG. 1) at opposite ends of the hub 13 by the aid of which the key 19 is carried by the pulley section 11 for axial movement therewith.

The key 19 is made of molded plastic material such as Nylatron or Teflon for minimizing frictional drag at the keyway 20 as the pulley section 11 is moved axially.

Such material has inadequate shear strength; however the configuration of the parts is such that no shearing force is imposed upon the key 19.

When the shaft 10 is rotated in a counterclockwise direction, a contact pressure exists between the key and the keyway surface 20b, as indicated by the arrows $F_1$ in FIG. 8. This contact pressure is unopposed by the opposite side wall 20a because the normal projection of the surface 20b clears the side wall 20a. The surfaces 21a and 21c of the hub recess 21, however, directly oppose the contact pressure $F_1$ as indicated by the arrows $F_2$ and $F_3$. The contact pressures $F_2$ and $F_3$, since they directly oppose the contact pressure $F_1$, cause the key 19 to be placed in compression and not in shear. The contact pressures $F_2$ and $F_3$ represent the pressure on the key 19. Opposite pressures are exerted by the key 19 on the hub recess 21, and which have components extending angularly about the axis of the shaft to produce the turning torque. Accordingly, the key 19 transmits the turning torque without the imposition of any shearing forces thereon.

When the shaft is rotated in the opposite direction, the surfaces 21b and 21d of the recess 21 oppose the side wall 20a of the keyway and the operation is similar.

The double V configuration of the recess 21 results in the key having a small wall thickness. This simplifies the molding process. Furthermore, the radial depth of the recess 21 is thus small, and the hub size need not be enlarged as compared to conventional structures. Contact pressures such as at $F_2$ and $F_3$ are readily equalized by accurate molding of the key structure on the one hand, and accurate forming of the recess 21 on the other. The recess 21 can be accurately formed by using a single composite cutting tool.

In the form of the invention illustrated in FIG. 6, a double V-keyway 30 is formed in the shaft 31 and a triple V recess 32 is formed in the hub 33 to provide increased capacity for transmitting torque. The key 34 is generally of sinuous or block W cross-sectional configuration, having successive wall sections extending angularly with respect to each other, alternate wall sections being parallel to each other. Crest and trough portions of the key thus formed respectively fit the hub recess 32 and the keyway 30. By virtue of the sinuous configuration, the overall radial dimension of the key is minimized, thus reducing the projection of the grooves into the shaft 31 and the hub 33. Accordingly, compact supporting structures for the key can be provided while the torque rating of the key is increased. The keyway 30 and recess 32 can respectively be formed by single composite cutting tools for accuracy.

In the form illustrated in FIG. 7, two separate keys 40 and 41 are provided in contiguous keyways 42 and 43 of the shaft 44. Contiguous recesses 45 and 46 are formed in the hub 47. A single tool may be used to cut the recesses 45 and 46 simultaneously to ensure accuracy. Each of the keys is substantially in the form of a block V.

In all of the forms illustrated, the multiple V configuration of the hub recess makes possible a thin, readily moldable key section and at the same time the depth of the recess is minimized.

The inventor claims:

1. In apparatus of the class described: a shaft having an axis of rotation; a member having an apertured hub through which said shaft extends, and slidably mounted on the shaft; said shaft having a keyway of V-shape configuration with the side walls thereof inclined substantially equally to a radial plane passing through the apex of the keyway and extending parallel to said axis; said member having a pair of substantially contiguous V-shaped recesses opening at the said aperture of said hub, the side walls of each of said recesses being inclined substantially equally to a radial plane passing through the apex of the corresponding recess, and extending parallel to said axis; said pair of V-shaped recesses of said member together having an angular span substantially equal to the angular span of the keyway at said aperture; a key made of moldable plastic material having a low coefficient of friction with respect to the material of said shaft, and a low shear strength as compared to the material of said shaft; said key having a configuration fitting said recesses and slidably fitting said keyway; means confining the key for axial movement with the said member; the configuration of said key, keyway and recesses substantially reducing shear forces imposed upon said key by causing said key to sustain the load of torque transmission between said shaft and said member substantially by compression of said key whereby the low friction characteristics of the key material and the low shear strength characteristics of the key material are compatible; the configuration of said key, keyway and recesses providing the equivalent of two separate keys small with respect to radial dimension of the keyway and recesses while requiring but one keyway for the key.

2. In apparatus of the class described: a shaft member having an axis of rotation; a member slidably mounted on the shaft member; said members having substantially cylindrical internal and external surfaces defining between them a substantially cylindrical boundary region; key means made of moldable plastic material having a low coefficient of friction with respect to the material of one of said members and a low shear strength characteristic as compared to the material of said one of said members; means coupling the key means to the said other of said members for axial movement therewith; said key means having a portion projecting from said other member beyond said boundary region; said one member having a recess forming a keyway opening at said boundary region and having surfaces extending parallel to said axis; said projecting portion of said key means having surfaces fitting said surfaces of said keyway whereby said members are coupled for transmission of torque between them; said fitting surfaces of said key means and said keyway having a configuration in a transverse cross-sectional plane comprising two or more substantially straight and substantially contiguous lines all of which are so angled with respect to the said cylindrical surfaces of said members that any normal to any of said lines that extends toward said boundary region does not intersect any other line, said lines are at least two in number and with adjacent lines being located respectively on opposite sides of a radial plane thru the axis of the shaft and extending at an acute angle with respect thereto.

3. The combination as set forth in claim 2 in which said lines are four in number, with the angle between the first and second and third and fourth lines extending at least 90° with respect to each other.

4. The combination as set forth in claim 3 in which said key means are formed in two parts, one part having surfaces fitting the surfaces of said keyway at said first and second lines, and the other part having surfaces fitting the surfaces of said keyway at said third and fourth lines.

5. The combination as set forth in claim 2 in which said other of said members also has a recess opening at said boundary region and having surfaces extending parallel to said axis; said key means having surfaces fitting the said surfaces of the recess of said other of said members; the fitting surfaces of said key means and said recess of said other of said members having a configuration in a transverse cross-sectional plane comprising two or more substantially straight and substantially contiguous lines all of which are so angled with respect to the said cylindrical surface of said members that any line normal to any of said lines that extends toward said boundary region does not intersect any such line.

6. In apparatus of the class described: a shaft member having an axis of rotation; a member slidably mounted on the shaft member; said members having substantially cylindrical internal and external surfaces defining between them a substantially cylindrical boundary region;

key means made of moldable plastic material having a low coefficient of friction with respect to the material of one of said members and a low shear strength characteristic as compared to the material of said one of said member; means coupling the key means to the said other of said members for axial movement therewith; said key means having a portion projecting from said other member beyond said boundary region; said one member having a recess forming a keyway opening at said boundary region and having surfaces extending parallel to said axis; said projecting portion of said key means having surfaces fitting said surfaces of said keyway whereby said members are coupled for transmission of torque between them; said key means having a configuration in a transverse cross-sectional plane in the form substantially of a block V with the apex of the V pointed substantially in a radial direction.

7. In apparatus of the class described: a shaft member having an axis of rotation; a member slidably mounted on the shaft member; said members having substantially cylindrical internal and external surfaces defining between them a substantially cylindrical boundary region; key means made of moldable plastic material having a low coefficient of friction with respect to the material of one of said members and a low shear strength characteristic as compared to the material of said one of said members; means coupling the key means to the said other of said members for axial movement therewith; said key means having a portion projecting from said other member beyond said boundary region; said one member having a recess forming a keyway opening at said boundary region and having surfaces extending parallel to said axis; said projecting portion of said key means having surfaces fitting said surfaces of said keyway whereby said members are coupled for transmission of torque between them; said key means having a configuration in a transverse cross-sectional plane in the form substantially of a block W with the apices of the W pointed substantially in a radial direction.

8. In apparatus of the class described: a shaft member having an axis of rotation; a member slidably mounted on the shaft member; said members having substantially cylindrical internal and external surfaces defining between them a substantially cylindrical boundary region; key means made of moldable plastic material having a low coefficient of friction with respect to the material of one of said members and a low shear strength characteristic as compared to the material of said one of said members; means coupling the key means to the said other of said members for axial movement therewith; said key means having a portion projecting from said other member beyond said boundary region; said one member having a recess forming a keyway opening at said boundary region and having surfaces extending parallel to said axis; said projecting portion of said key means having surfaces fitting said surfaces of said keyway whereby said members are coupled for transmission of torque between them; said key means comprising two separate side-by-side parts each having a configuration in a transverse cross-sectional plane in the form substantially of a block V with the apex of each V pointed substantially in a radial direction.

9. The combination as set forth in claim 2 in which said cylindrical internal and external surfaces are spaced from each other; a plastic sleeve accommodated between said cylindrical surfaces and having a slot; the edges of the slot adjoining the respective sides of said key means so that said key means and said sleeve together occupy the said boundary region; means coupling said sleeve to the other of said members for axial movement therewith and with said key means.

References Cited
UNITED STATES PATENTS

| | | | |
|---|---|---|---|
| 198,481 | 12/1877 | Woodbury | 287—52.05 |
| 408,835 | 8/1889 | Grafton | 287—52.05 |
| 1,804,699 | 5/1931 | Maier | 287—52.05 |
| 2,197,631 | 4/1940 | Doran | 287—52.05 |
| 2,956,595 | 10/1960 | Warrick et al. | 287—52.05 X |
| 3,138,032 | 6/1940 | Raso et al. | 287—52.05 X |

FOREIGN PATENTS

| | | |
|---|---|---|
| 1,009,790 | 3/1952 | France. |

CARL W. TOMLIN, *Primary Examiner.*

A. KNUDRAT, *Assistant Examiner.*